(No Model.)
R. GILLHAM.
CARRYING PULLEY FOR CABLE RAILWAYS.
No. 312,624. Patented Feb. 24, 1885.
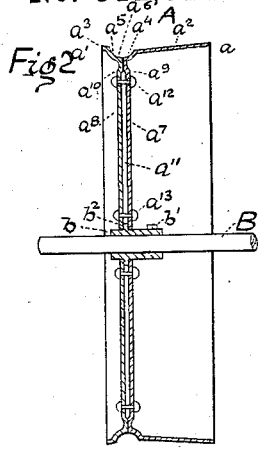
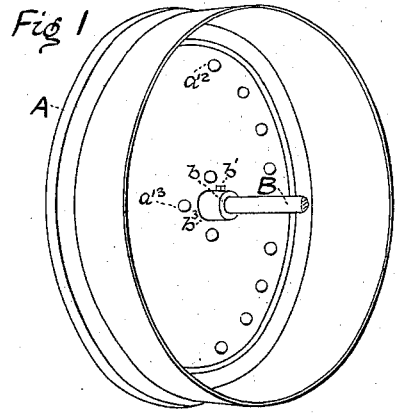
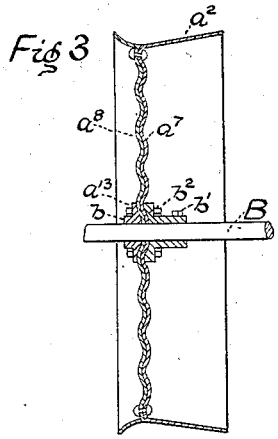
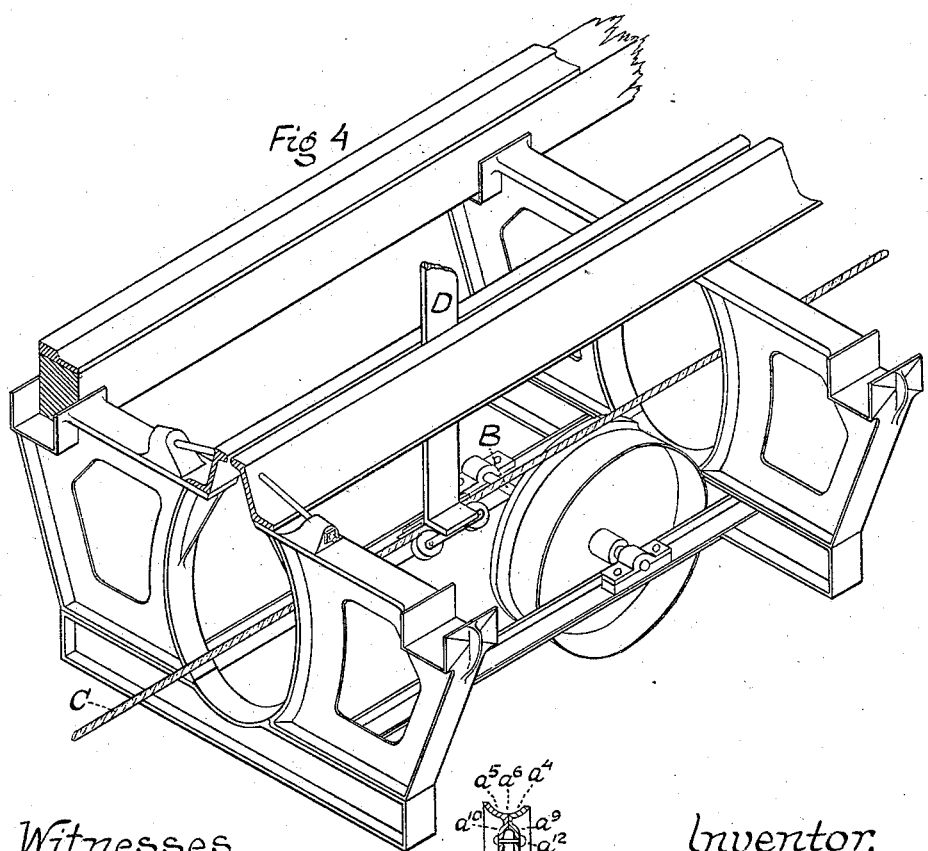
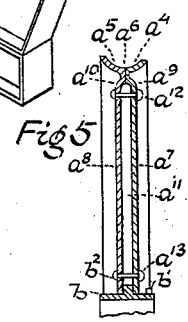
Witnesses.
L. B. Bailey
Charles Marcotte
Inventor.
Robert Gillham
per Rich'd H. Manning Atty

UNITED STATES PATENT OFFICE.

ROBERT GILLHAM, OF KANSAS CITY, MISSOURI.

CARRYING-PULLEY FOR CABLE RAILWAYS.

SPECIFICATION forming part of Letters Patent No. 312,624, dated February 24, 1885.

Application filed August 14, 1884. (No model.)

*To all whom it may concern:*

Be it known that I, ROBERT GILLHAM, a citizen of the United States, residing at Kansas City, in the county of Jackson and State of Missouri, have invented certain new and useful Improvements in Carrying-Pulleys for Cable Railways; and I do hereby declare that the following is a full, clear, and exact description of the invention, which will enable others skilled in the art to which it appertains to make and use the same, reference being had to the accompanying drawings, forming a part of this specification.

My invention has for its object a carrying-pulley for the transmission of power which possesses the advantages of lightness and durability, and at the same time will sustain the impact of the swaying slack of the cable, and whereby the cable may be readily taken up and transmitted with greater certainty and with a minimum degree of friction; and it consists in the novel construction and combination of its several parts, which will first be fully described, and then specifically pointed out in the claims.

In the drawings, Figure 1 is a view in perspective of my improved pulley. Fig. 2 is a sectional view of the pulley, taken on the line $x\ x$ of Fig. 1. Fig. 3 is a sectional view of the pulley, showing an alternate construction. Fig. 4 is an isometrical view of the road-bed of a cable railway, and of the pulley journaled in a longitudinal I-beam. Fig. 5 is a sectional view of a portion of the pulley, showing the grooved part of the flanges singly.

A represents the pulley, which is constructed in two sections, $a$ and $a'$.

$a^2$ and $a^3$ are the opposite peripheral flanges of the pulley.

$a^4$ is the concave depression in the flange $a^2$ of section $a$, and $a^5$ is the concave depression in flange $a^3$ of section $a'$.

$a^6$ is the dividing point between the opposite sections, $a$ and $a'$.

$a^7$ and $a^8$ are the opposite webs of the pulley.

$a^9\ a^{10}$ are shoulders between the webs $a^7$ and $a^8$.

$a^{11}$ represents the space between the webs.

$a^{12}\ a^{13}$ are bolts uniting the opposite sections $a$ and $a'$ of the pulley.

B is a shaft.

$b$ is a hub on shaft B, to which the webs of the pulley are attached.

$b'$ is a screw-bolt retaining hub $b$ in place on shaft B.

$b^2$ is a radial flange on hub $b$.

C represents a wire cable, and D the ordinary cable-clutch.

In the construction of my invention I stamp out in a suitable die in one piece, from material of proper thickness, and in the best manner, the opposite sections severally of the pulley, designated, respectively, $a$ and $a'$. Section $a$ of the pulley is made with a wide peripheral inclined flange, $a^2$, and with its web $a^7$ in one piece. The compression given the material forms the peripheral flange $a^2$ at an angle in relation to its web, and is continued until the proper inclination of said flange, as shown in the drawings, is obtained. I also form a circumferential concave depression outwardly in said flange contiguous to the web $a^7$ by compression in the same manner in which the said flange is formed, and of the proper depth, thus making one part of the groove to the pulley. I then form the shoulder $a^9$ from the web $a^7$ by compressing said web $a^7$ a slight distance in the same direction in which the flange $a^2$ is projected, leaving the said shoulder $a^9$ extending in an opposite direction to and entirely around said web, and between the concave depression $a^4$ and the web $a^7$, radially to a proportionate extent. The section $a'$ of the pulley I then form in the same manner in which the section $a^2$ is formed, with the exception that the peripheral flange $a^3$ is made of less width than the flange $a^2$, and more nearly at right angles to its web $a^8$. The hub $b$ is then made cylindrical and with a longitudinal perforation, to receive the shaft B. A radial flange, $b^2$, is formed midway upon and projecting a slight distance from said hub. Through each respective web I then make a central perforation to and in a transverse relation to the same, of the proper size to receive the hub $b$. Each of the respective webs $a^7$ and $a^8$ are then fitted to said hub on opposite sides of the radial flange $b^2$, so that the said webs will close against and be separated by said flange and the shoulders $a^9$ and $a^{10}$ contiguous, forming thereby the space $a^{11}$ between the webs, and the concave peripheral groove of the proper width and depth. The opposite webs are then secured firmly together by the bolts $a^{12}$ and $a^{13}$, one row just beneath the shoulders $a^9$ and $a^{10}$, passing through said webs, and another row a suitable distance above the radial flange $b^2$, said bolts being equidistant apart around the entire webs.

In Fig. 3 I have shown corrugated webs, which I form with the corrugations so constructed that they shall fay one within another, thus adding strength to the web. In this latter form of pulleys I make the perforation centrally through the corrugated web in size adapted to receive the shaft, and with a hub in two transverse sections, each section having a radial flange which are placed on the hub, so as to fit closely against and on each respective side of the web, with their perforations corresponding and the bolts passing through the radial flanges as well as through the corrugated web, securing the hub firmly thereto. The web of the pulley, as shown in Fig. 2, may also be formed with corrugations extended so far radially as it may be necessary and admit of its being secured in the manner shown.

In Fig. 4 a simplified construction is shown for the ordinary form of grooved pulley, the flanges being extended only the required distance laterally to the web in which to permit of a concave depression being formed therein and obtain the required depth of groove.

My invention affords more particularly for cable railways a pulley which will sustain the impact in the fall thereon of the wire cable, the slack in said cable following in the rapid transit of the car in its rear, and for which purpose a strong and well-supported web becomes absolutely necessary.

The material used for the pulley being of iron or steel of the proper thickness for its suitable compression under power, the manner of construction will at once show its advantages over a single web with the usual thickness. I also afford a light pulley in weight, which reduces the draft-power required ordinarily upon the cable.

The wide peripheral flange, it will be observed, is so formed that, in the sway of the cable, said cable will be readily taken up without the liability of slipping to one side and be conducted along the inclined periphery to the groove with the least appreciable wear. The advantage is also seen in my improved pulley that it can be constructed more rapidly and accurately than any other form, it being without welds or surface abrasions and with greater economy in the material used. The corrugated pulley is made of increased value in the construction shown, and can be formed, together with the flanges, in one operation and thus simplifying its manufacture.

In forming the web and flange in one piece I obviate the necessity of puncturing the flange to admit bolts, which are subject to repair, and preserve thereby the full elasticity of the pulley.

Having fully described my invention, what I now claim as new, and desire to secure by Letters Patent, is—

1. A pulley having opposite sections, each section consisting of a web and a peripheral flange in a single piece, as shown and described.

2. A pulley having opposite sections, each section consisting of a web and a grooved peripheral flange in a single piece, as shown and described.

3. A pulley having opposite sections, each section consisting of a web and a peripheral flange in a single piece, and an intermediate shoulder, for the purpose specified.

4. A pulley having opposite sections, each section consisting of a web, a grooved peripheral flange, and an intermediate shoulder in a single piece, as described.

5. A pulley having a suitable web, a peripheral flange, a groove circumferentially in said flange, and a lateral extension of said flange, which is inclined, as and for the purpose specified.

6. A pulley having opposite sections, each section consisting of a web, a peripheral flange, and a shoulder on said web, in combination with a hub provided with a radial flange, for the purpose specified.

7. A pulley having opposite sections, each section consisting of a web having a corresponding irregular surface radially in respect to the web of an adjoining section, which are adapted to fay therein, and a peripheral flange, as shown and described.

In testimony whereof I have hereunto set my hand in the presence of two witnesses.

ROBERT GILLHAM.

Witnesses:
   FRED. W. PERKINS,
   OWEN H. MCGEE.